US011319084B2

(12) United States Patent
Geliot et al.

(10) Patent No.: US 11,319,084 B2
(45) Date of Patent: May 3, 2022

(54) PROPULSIVE ASSEMBLY OF AN AIRCRAFT COMPRISING A JUNCTION FAIRING BETWEEN A NACELLE AND A PYLON OF THE AIRCRAFT EQUIPPED WITH A REMOVABLE COWL AND AIRCRAFT EQUIPPED WITH SAID PROPULSIVE ASSEMBLY

(71) Applicant: Airbus Operations SAS, Toulouse (FR)

(72) Inventors: Jean Geliot, Toulouse (FR); Christophe Labarthe, Buzet sur Tarn (FR)

(73) Assignee: AIRBUS OPERATIONS SAS, Toulouse (FR)

(*) Notice: Subject to any disclaimer, the term of this patent is extended or adjusted under 35 U.S.C. 154(b) by 214 days.

(21) Appl. No.: 16/720,848

(22) Filed: Dec. 19, 2019

(65) Prior Publication Data

US 2020/0198793 A1 Jun. 25, 2020

(30) Foreign Application Priority Data

Dec. 21, 2018 (FR) ...................................... 1873824

(51) Int. Cl.
*B64D 29/06* (2006.01)
*B64D 29/08* (2006.01)
(Continued)

(52) U.S. Cl.
CPC ............. *B64D 29/06* (2013.01); *B64D 29/08* (2013.01); *B64C 7/02* (2013.01); *B64D 27/26* (2013.01);
(Continued)

(58) Field of Classification Search
CPC .. B64D 27/26; B64D 2027/264; B64D 29/06; B64D 29/08; B64D 2033/0286; B64C 7/02
(Continued)

(56) References Cited

U.S. PATENT DOCUMENTS 4,585,189 A * 4/1986 Buxton ................... B64D 29/08
244/129.4
6,220,546 B1 * 4/2001 Klamka ................. B64D 29/00
244/129.4
(Continued)

FOREIGN PATENT DOCUMENTS

EP 2392509 A1 12/2011
FR 2902406 A1 12/2007
(Continued)

OTHER PUBLICATIONS

French Search Report; priority document.

*Primary Examiner* — Brady W Frazier
(74) *Attorney, Agent, or Firm* — Greer, Burns & Crain, Ltd.

(57) ABSTRACT

A propulsive assembly of an aircraft comprises a junction fairing, ensuring a continuity between a nacelle and a pylon, which comprises a fixed frame, linked to the nacelle and/or to the pylon by a link system configured to absorb any deformations and/or misalignments between the nacelle and the pylon in operation, which has an outer wall comprising an opening, a cowl, mobile between a closed position in which the cowl blocks the opening, and an open position in which the cowl at least partially frees the opening, which has a panel, the outer wall of the fixed frame and the panel of the cowl having outer surfaces which form the aerodynamic surface of the junction fairing. An aircraft is also provided which comprises at least one such propulsive assembly.

8 Claims, 10 Drawing Sheets

(51) Int. Cl.
  *B64C 7/02* (2006.01)
  *B64D 27/26* (2006.01)
  *B64D 33/02* (2006.01)
  *F01D 25/24* (2006.01)

(52) U.S. Cl.
  CPC .......... *B64D 2027/264* (2013.01); *B64D 2033/0286* (2013.01); *E05Y 2900/502* (2013.01); *F01D 25/24* (2013.01); *F05D 2220/323* (2013.01); *F05D 2230/80* (2013.01); *F05D 2240/14* (2013.01)

(58) Field of Classification Search
  USPC .......................................................... 244/54
  See application file for complete search history.

(56) References Cited

U.S. PATENT DOCUMENTS

| | | | |
|---|---|---|---|
| 8,939,398 B2* | 1/2015 | Letay | B64D 29/06 244/54 |
| 2008/0023584 A1* | 1/2008 | Beaufort | B64D 29/06 244/54 |
| 2009/0283631 A1 | 11/2009 | Roche | |
| 2010/0176250 A1 | 7/2010 | Porte | |
| 2011/0127367 A1* | 6/2011 | Ramlaoui | B64D 29/08 244/54 |
| 2011/0127369 A1 | 6/2011 | Dussol et al. | |
| 2011/0297787 A1 | 12/2011 | Guillaume et al. | |
| 2013/0161446 A1* | 6/2013 | Letay | F02C 7/20 244/54 |
| 2013/0259641 A1* | 10/2013 | Stewart | F01D 25/24 415/1 |
| 2016/0340024 A1* | 11/2016 | Pautis | B64D 29/08 |
| 2018/0362172 A1* | 12/2018 | Paolini | E05D 5/062 |
| 2018/0362174 A1* | 12/2018 | Paolini | B64D 27/16 |

FOREIGN PATENT DOCUMENTS

| | | |
|---|---|---|
| FR | 2920409 A1 | 3/2009 |
| WO | 2008006826 A1 | 1/2008 |

* cited by examiner

PROPULSIVE ASSEMBLY OF AN AIRCRAFT COMPRISING A JUNCTION FAIRING BETWEEN A NACELLE AND A PYLON OF THE AIRCRAFT EQUIPPED WITH A REMOVABLE COWL AND AIRCRAFT EQUIPPED WITH SAID PROPULSIVE ASSEMBLY

CROSS-REFERENCES TO RELATED APPLICATIONS

This application claims the benefit of the French patent application No. 1873824 filed on Dec. 21, 2018, the entire disclosures of which are incorporated herein by way of reference.

FIELD OF THE INVENTION

The present application relates to a propulsive assembly of an aircraft comprising a junction fairing between a nacelle and a pylon of the aircraft equipped with a removable cowl and an aircraft equipped with the propulsive assembly.

BACKGROUND OF THE INVENTION

According to one embodiment, a propulsive assembly comprises a turbojet engine and a nacelle, in which the turbojet engine is positioned, as well as a pylon linking the turbojet engine to the airfoil of the aircraft. The front end of the pylon and the nacelle comprise a junction fairing, also called front fairing. This junction fairing comprises a wall having a domed first zone, conformed like the pylon, prolonged on each side and at the front by a second zone conformed like the nacelle. This wall is linked to the structure of the nacelle and/or of the pylon by a link making it possible to absorb any misalignments and/or deformations generated in operation, notably because of the thrust of the turbojet engine. This link, which is relatively complex, is not easy to dismantle and reassemble so that it is difficult to access the interior of the nacelle, under the junction fairing, for maintenance or inspection operations.

SUMMARY OF THE INVENTION

The present invention aims to remedy all or part of the drawbacks of the prior art.

To this end, a subject of the invention is a propulsive assembly of an aircraft comprising a nacelle, a pylon and a junction fairing having an aerodynamic surface ensuring a continuity between the nacelle and the pylon, characterized in that the junction fairing comprises:

- a fixed frame, linked to the nacelle and/or to the pylon by a link system configured to absorb any deformations and/or misalignments between the nacelle and the pylon in operation, which has an outer wall comprising an opening,
- a cowl that is mobile between a closed position in which it blocks the opening and an open position in which it at least partially frees the opening, which has a panel, the outer wall of the fixed frame and the panel of the cowl having outer surfaces which form the aerodynamic surface of the junction fairing.

The junction fairing of the invention makes it possible to absorb any deformations and/or misalignments between the nacelle and the pylon in operation, while making it possible to easily access a zone located under the junction fairing. According to the invention, the link of the junction fairing making it possible to absorb any deformations and/or misalignments between the nacelle and the pylon is dissociated from the link allowing access to the zone located under the junction fairing.

According to another feature, the panel of the cowl has an outline substantially identical to an inner peripheral edge of the outer wall delimiting the opening in such a way that the outer surface of the panel of the cowl is flush with the outer surface of the outer wall of the fixed frame.

According to another feature, the junction fairing comprises at least one articulation linking the cowl and the fixed frame.

According to another feature, the articulation is a pivoting link allowing the cowl to pivot about a pivoting axis.

According to another feature, the junction fairing comprises a locking system configured to hold the cowl in closed position.

According to a configuration, the articulation is positioned close to a first side of the cowl and the locking system is positioned on a second side of the cowl opposite the first side.

According to another feature, the junction fairing comprises a centering system configured to immobilize the cowl according to a direction of flow of an air stream flowing over the aerodynamic surface of the junction fairing in operation.

According to one configuration, the centering system comprises at least one centering piece comprising a pin integral to the cowl and a recess integral to the fixed frame, the pin and the recess being configured to occupy an engaged state, when the cowl is in closed position, in which the pin is positioned in the recess, and a disengaged state, in which the pin is positioned outside the recess, the pin having a first dimension taken according to the direction of flow, that is substantially identical to a second dimension of the recess that is also taken according to the direction of flow.

According to another feature, the junction fairing comprises at least one actuator to promote an opening movement of the cowl and/or to hold it in open position.

According to another feature, the link system comprises at least one front link and at least one rear link, each front link being configured to allow a translational movement in a longitudinal direction, each rear link being configured to allow a pivoting movement about an axis of rotation that is horizontal and at right angles to the longitudinal direction.

An aircraft comprising at least one propulsive assembly according to one of the preceding features is also a subject of the invention.

BRIEF DESCRIPTION OF THE DRAWINGS

Other features and advantages will emerge from the following description of the invention, description being given purely by way of example, in light of the attached drawings in which.

DETAILED DESCRIPTION OF THE PREFERRED EMBODIMENTS

Figure 1:
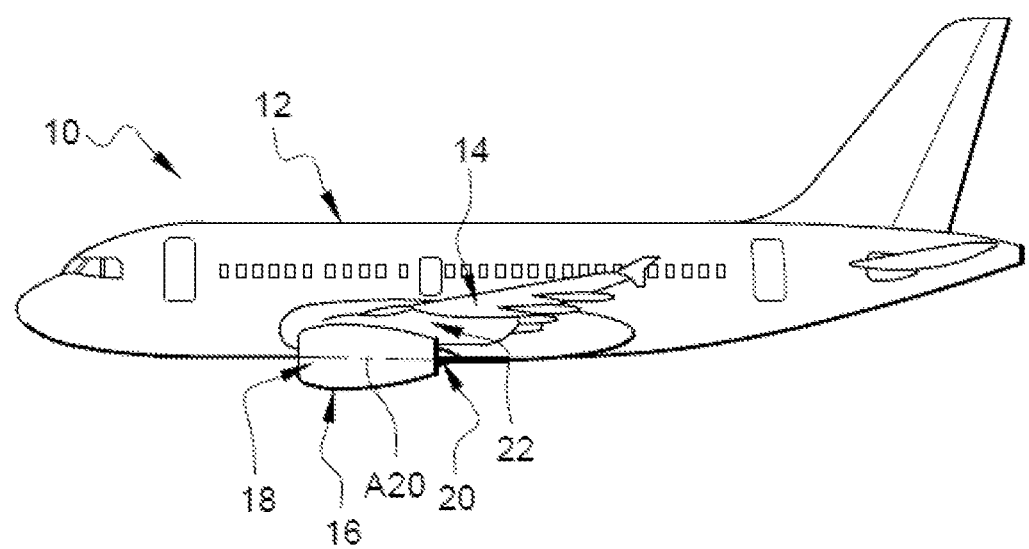
FIG. 1 is a side view of an aircraft.

FIG. 1 shows an aircraft 10 which comprises a fuselage 12, wings 14 and propulsive assemblies 16, each linked to one of the wings 14. Each propulsive assembly 16 comprises a nacelle 18, a turbojet engine 20, positioned inside the nacelle, and a pylon 22 linking the turbojet engine 20 to one of the wings 14.

For the rest of the description, a longitudinal direction is a direction parallel to the axis of the turbojet engine A20. A longitudinal plane is a plane containing the axis of the turbojet engine A20. A transverse plane is a plane at right angles to the axis of the turbojet engine A20. The terms "front" and "rear" refer to the direction of the air stream passing through the turbojet engine 20, the latter going from front to rear.

Figure 2:
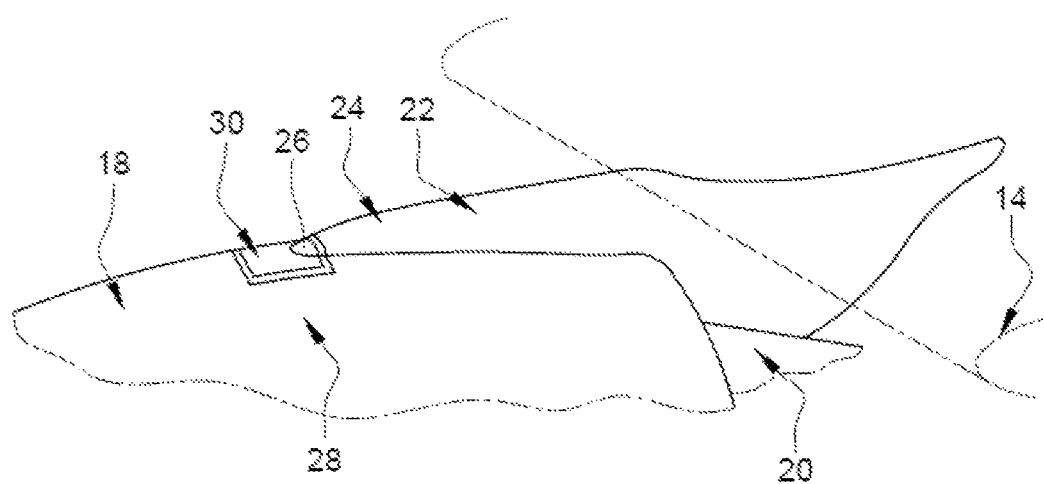
FIG. 2 is a perspective view from above of a propulsive assembly.

As illustrated in FIG. 2, the pylon 22 comprises a secondary structure 24, ensuring the aerodynamic fairing function, in the form of an inverted gutter which has a beveled front point 26. The nacelle 18 comprises an outer wall 28, ensuring the aerodynamic fairing function, which has, at the front of the pylon 22 and in line with the pylon 22, an approximately cylindrical form.

The propulsive assembly 16 comprises a junction fairing 30 (also called front fairing) ensuring a continuity between the pylon 22 and the nacelle 18. This junction fairing 30 has an outer surface comprising a domed first zone, conformed like the pylon, prolonged on each side and at the front by a second zone, having, in a transverse plane, a curvature, conformed like the nacelle. The junction fairing 30 is delimited by a peripheral edge which can be identical to that of a junction fairing of the prior art.

The nacelle 18 and the pylon 22 comprise a cutout 31 whose forms match those of the peripheral edge of the junction fairing 30 so as to ensure a continuity between the surfaces of the nacelle 18 and of the pylon 22 and those of the junction fairing 30.

Figure 3:
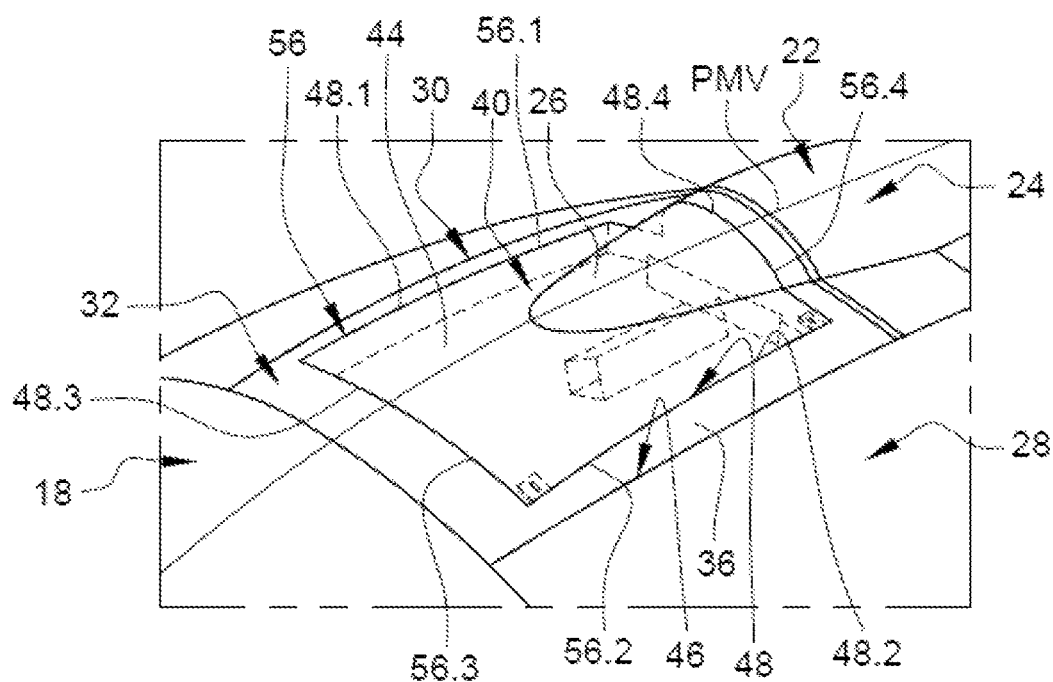
FIG. 3 is a perspective view of a junction fairing which illustrates an embodiment of the invention in closed position.
Figure 4:
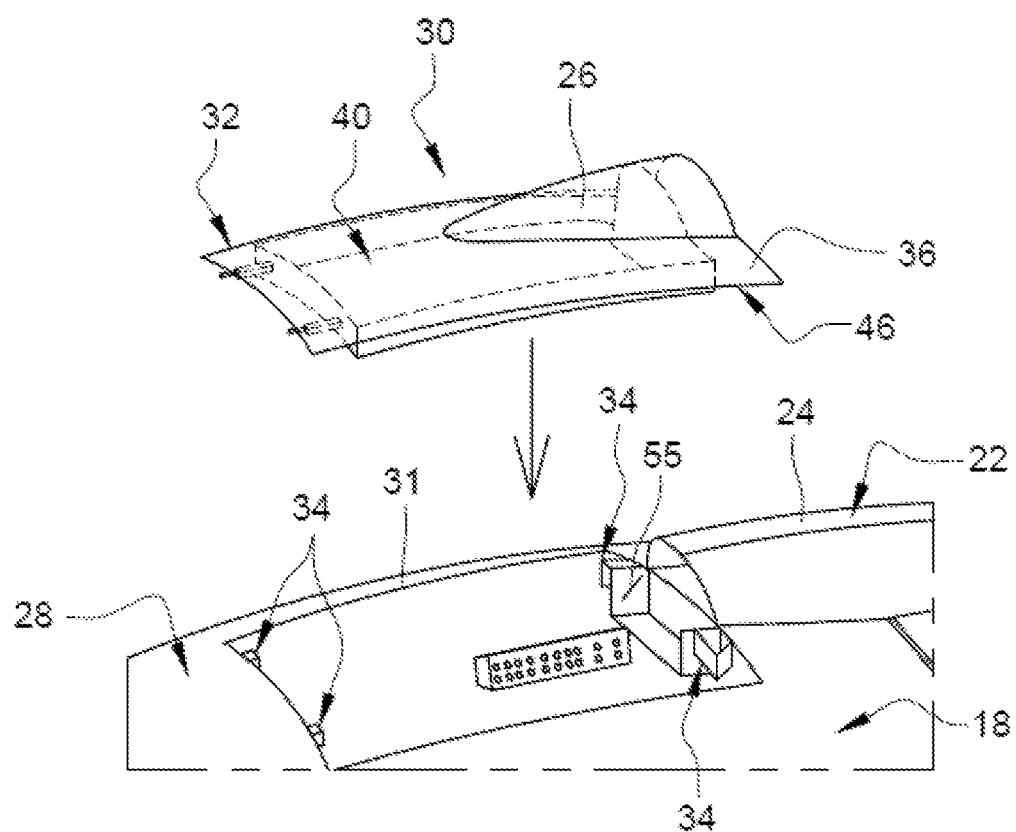
FIG. 4 is a perspective view of the junction fairing, visible in FIG. 3, in the dismantled state.
Figure 7:
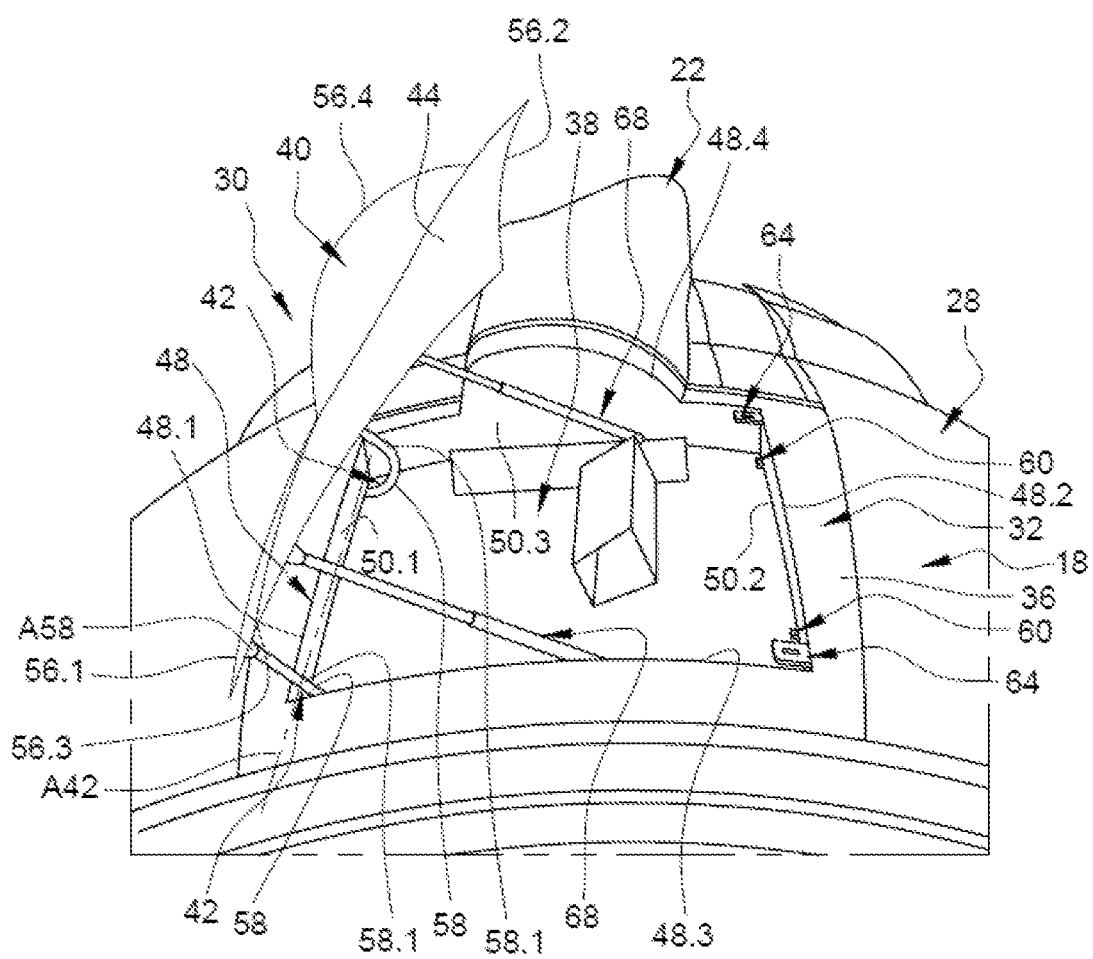
FIG. 7 is a perspective view of the junction fairing, visible in FIG. 3, in open position.
Figure 8:
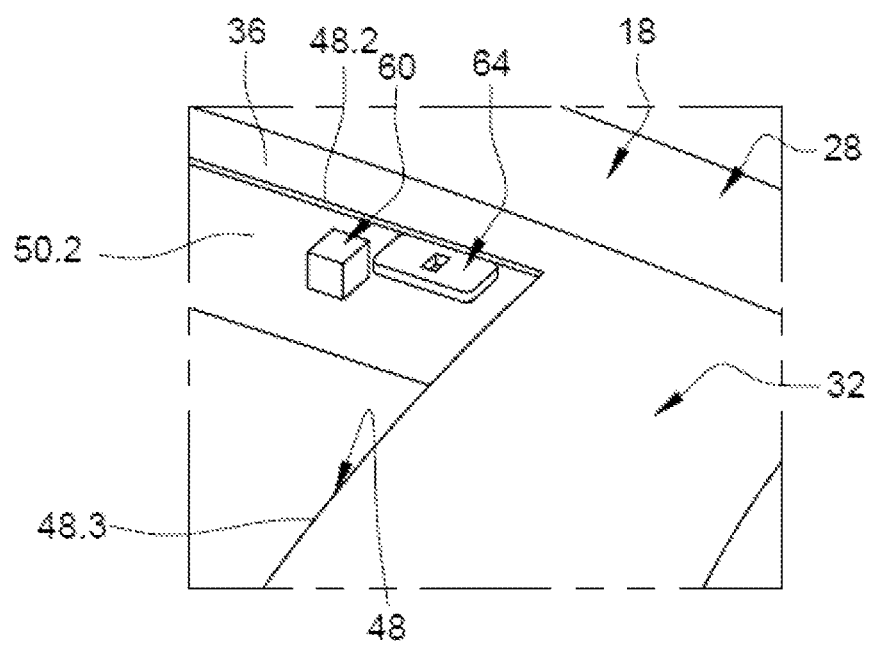
FIG. 8 is a perspective view of a part of the centering and locking systems of a cowl of the junction fairing which illustrates an embodiment of the invention.

According to a feature of the invention, the junction fairing 30 comprises a fixed frame 32 linked to the nacelle 18 and/or to the pylon 22 by a link system 34 configured to absorb any deformations and/or misalignments between the nacelle 18 and the pylon 22 in operation, the fixed frame 32 comprising an outer wall 36 in which there is provided an opening 38 (visible in FIG. 7) making it possible to access the interior of the nacelle 18. Complementing the fixed frame 32, the junction fairing 30 comprises a cowl 40, linked to the fixed frame 32 by at least one articulation 42, the cowl 40 being mobile between a closed position in which it blocks the opening 38 (as illustrated in FIG. 3) and an open position in which it at least partially frees the opening 38 (as illustrated in FIG. 7).

The cowl 40 comprises a panel 44 which has an outer surface which is flush with the outer surface of the outer wall 36 of the fixed frame 32.

According to one embodiment, the outer wall 36 of the fixed frame 32 comprises an outer peripheral edge 46, rectangular when seen from above, which matches the outline of the cutout 31 of the nacelle 18 and of the pylon 22, and an inner peripheral edge 48 (visible in FIG. 7), that is rectangular when seen from above, which delimits the opening 38. According to one configuration, the inner peripheral edge 48 is centered approximately within the outer peripheral edge 46.

The inner peripheral edge 48 comprises two right and left sides 48.1, 48.2, parallel to one another and parallel to the longitudinal direction, two front and rear sides 48.3, 48.4 at right angles to the longitudinal direction. The two right and left sides 48.1, 48.2 are approximately rectilinear. The front side 48.3 is slightly curved. The rear side 48.4 has an omega form and has a central portion in the form of an inverted U with, on either side, a slightly curved extension.

The fixed frame 32 comprises right, left, front and rear walls 50.1 to 50.4 positioned respectively plumb with the right, left, front and rear sides 48.1 to 48.4 that are at right angles to one another pairwise.

The fixed frame 32 is approximately symmetrical relative to a vertical median plane PMV, passing through the axis of the turbojet engine A20.

The link system 34 comprises at least one front link 52 and at least one rear link 54.

Figure 5:
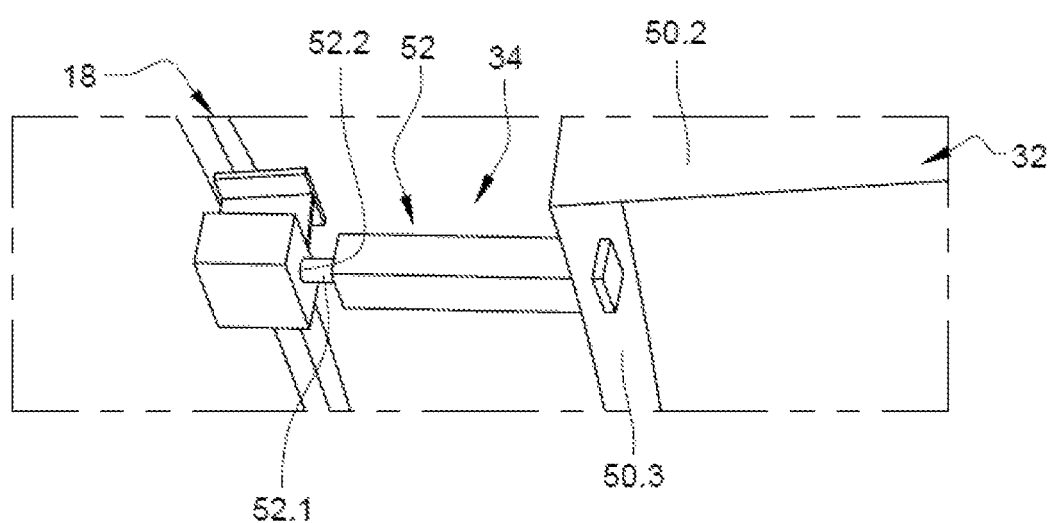
FIG. 5 is a perspective view of a front link of the junction fairing which illustrates an embodiment of the invention.

The link system 34 comprises two front links 52 positioned symmetrically relative to the vertical median plane PMV. Each front link 52 is an annular link allowing a translational movement in a direction approximately parallel to the longitudinal direction. According to an embodiment visible in FIG. 5, each front link 52 comprises a cylindrical finger 52.1, integral to the fixed frame 32, oriented parallel to the longitudinal direction, a guide 52.2 integral to the nacelle 18 having an orifice, having a diameter equal to that of the finger 52.1, positioned in a transverse plane. According to one configuration, for each front link 52, the finger 52.1 is integral to the front wall 50.3.

Figure 6:
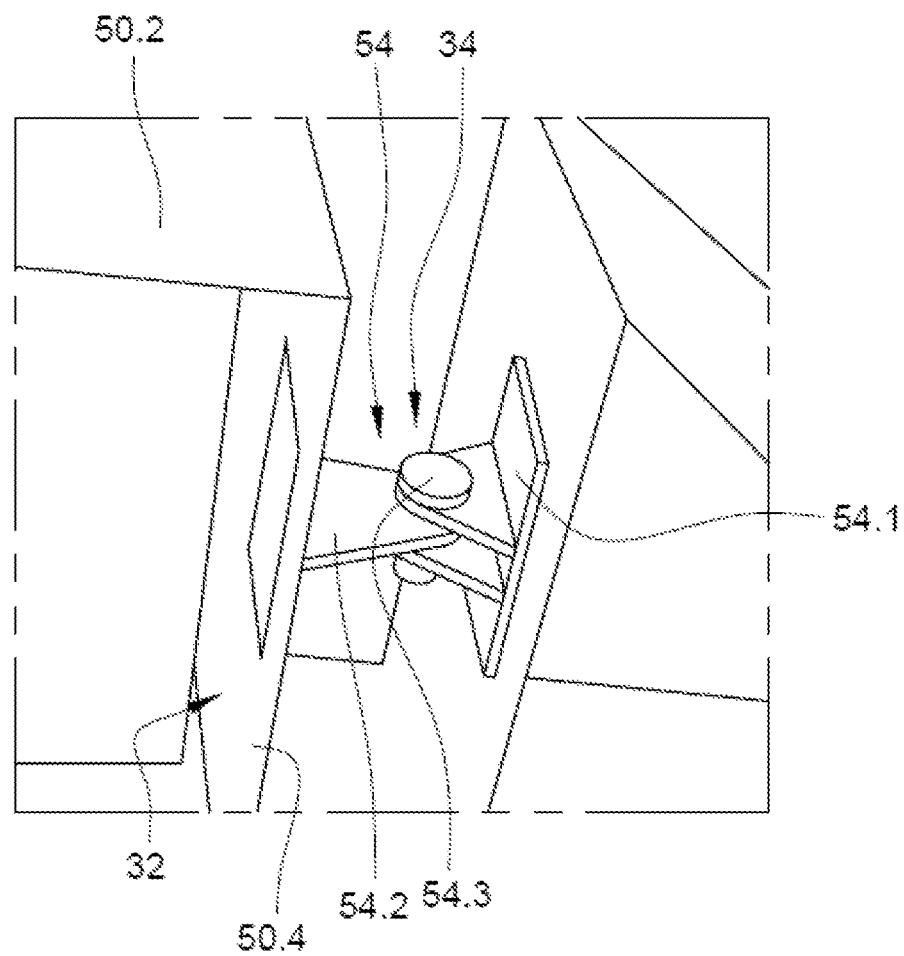
FIG. 6 is a perspective view of a rear link of the junction fairing which illustrates an embodiment of the invention.

The link system 34 comprises two rear links 54 positioned symmetrically relative to the vertical median plane PMV. Each rear link 54 is a pivot link allowing a rotational movement about an axis of rotation that is horizontal and at right angles to the longitudinal direction. According to an embodiment visible in FIG. 6, each rear link 54 comprises a yoke joint 54.1 integral to the nacelle 18 and/or to the pylon 22 which has two branches between which there is positioned a plate 54.2 integral to the fixed frame 32, the yoke joint 54.1 and the plate 54.2 being linked by an axis of rotation 54.3. According to one configuration, for each rear link 54, the plate 54.2 is integral to the rear wall 50.4 and the yoke joint 54.1 is fixed to a support 55 integral to the nacelle 18 and/or to the pylon 22.

Obviously, the invention is not limited to this embodiment for the link system 34 which could be identical to the embodiments of the prior art.

The panel 44 of the cowl 40 has an outline 56 substantially identical to the inner peripheral edge 48 of the outer wall 46 of the fixed frame 32 such that the outer surface of the panel 44 of the cowl 40 is flush with the outer surface of the outer wall 36 of the fixed frame 32. The outline 56 comprises two right and left sides 56.1, 56.2 and two front and rear sides 56.3, 56.4. The two right and left sides 56.1, 56.2 are approximately rectilinear, like the right and left sides 48.1, 48.2 of the inner peripheral edge 48 of the outer panel 46 of the fixed frame 32. The front side 56.3 is slightly curved, like the front side 48.3 of the inner peripheral edge 48 of the outer panel 46 of the fixed frame 32. The rear side

56.4 has an omega form and has a central portion in the form of an inverted U with, on either side, a slightly curved extension, like the rear side 48.4 of the inner peripheral edge 48 of the outer panel 46 of the fixed frame 32.

According to one embodiment, the articulation 42 is a pivoting link allowing the cowl 40 to pivot about a pivoting axis A42, positioned close to a first side of the cowl 40, approximately parallel to the longitudinal direction. According to one configuration, the articulation 42 comprises two hinges 58 positioned close to the ends of one of the sides 56.1, 56.2 (right or left) of the panel 44 of the cowl 40. Each hinge 58 comprises a swan neck 58.1, of which a first end is linked to the fixed frame 32 by an axis of rotation parallel to the longitudinal direction and a second end is linked to the panel 44 of the cowl 40 by an axis of rotation A58 parallel to the longitudinal direction.

Figure 10:
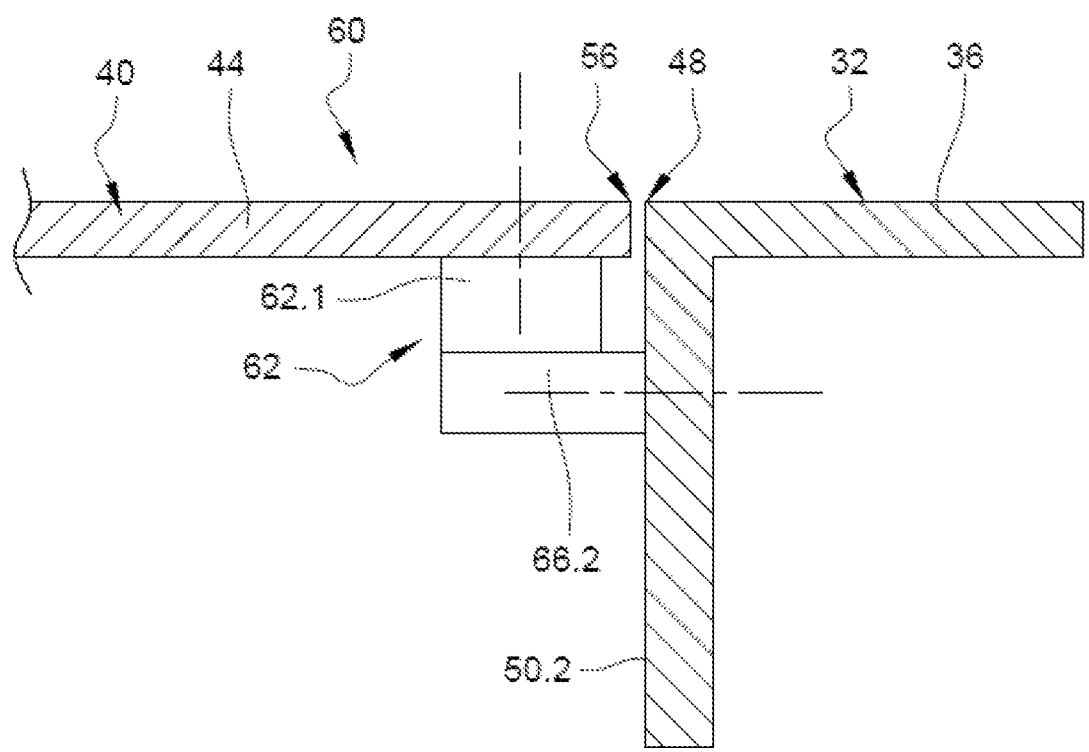
FIG. 10 is a cross section of a locking system of the cowl of the junction fairing which illustrates an embodiment of the invention.

According to one embodiment, the junction fairing 30 comprises a locking system 60 configured to hold the cowl 40 in closed position. According to one configuration, the locking system 60 comprises two latches 62 positioned close to the ends of a side 56.1, 56.2 of the panel 44 opposite that supporting the hinges 58. According to an embodiment visible in FIG. 10, each latch 62 comprises a first part 62.1 integral to the panel 44 of the cowl 40 and a second part 62.2 integral to the fixed frame 32, configured to occupy a locked state in which the first and second parts 62.1 and 62.2 are immobile with respect to one another and hold the cowl 40 in closed position and an unlocked state in which the first and second parts 62.1 and 62.2 are no longer immobilized with respect to one another and allow an opening movement of the cowl 40.

Figure 9:
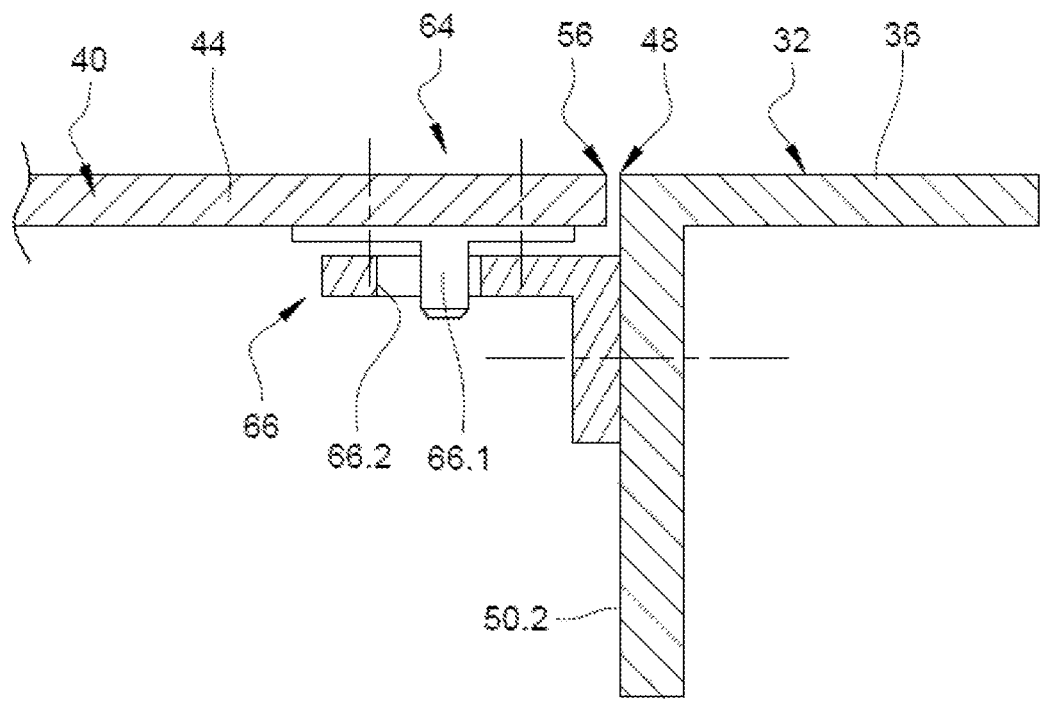
FIG. 9 is a cross section of a centering system of the cowl of the junction fairing which illustrates an embodiment of the invention.

According to one embodiment, the junction fairing 30 comprises a centering system 64 configured to immobilize the cowl 40 according to the longitudinal direction (parallel to the direction of flow of an air stream flowing over the aerodynamic surface of the junction fairing 30 in operation) when it is in the closed position. According to one embodiment, the centering system 64 comprises two centering pieces 66 positioned close to the ends of a side 56.1, 56.2 of the panel 44 opposite that supporting the hinges 58. According to an embodiment visible in FIG. 9, each centering piece 66 comprises a pin 66.1 integral to the cowl 40 and a recess 66.2 integral to the fixed frame 32, the pin 66.1 and the recess 66.2 being configured to occupy an engaged state, when the cowl is in closed position, in which the pin 66.1 is positioned in the recess 66.2 and a disengaged state in which the pin 66.1 is positioned outside the recess 66.2. The pin 66.1 has a first dimension taken according to the longitudinal direction that is substantially identical to a second dimension of the recess 66.2 that is also taken according to the longitudinal direction. Thus, in the engaged state, the pin 66.1 is translationally immobilized in the longitudinal direction relative to the recess 66.2. To promote the introduction of the pin 66.1, the recess 66.2 has an oblong form which has a great dimension oriented at right angles to the longitudinal direction and a small dimension oriented parallel to the longitudinal direction which has a dimension approximately equal to the first dimension of the pin 66.1. Obviously, the invention is not limited to this embodiment. Thus, the pin 66.1 could be integral to the fixed frame 32 and the recess 66.2 could be integral to the cowl 40.

According to one configuration, the articulation 42 is positioned on the right wall 50.1 of the fixed frame 32 and the locking and centering systems 60, 64 are positioned on the left wall 50.2.

According to one embodiment, the junction fairing 30 comprises at least one actuator 68 to promote the opening movement of the cowl 40 and/or to hold it in open position. According to one configuration, the junction fairing 30 comprises two actuators 68 positioned on the front and rear sides 56.3, 56.4 of the panel 44 of the cowl 40. Each actuator 68 takes the form of a pneumatic cylinder comprising a first end 68.1 linked to the fixed frame 32, more specifically to the front or rear wall 50.3, 50.4, at a point away from the articulation 42, and a second end 68.2 linked to the panel 44 of the cowl 40, at a point away from the articulation 42.

In operation, the cowl 40 is held in closed position by the locking system 60. The outer wall 36 of the fixed frame 32 and the panel 44 of the cowl 40 form an aerodynamic surface that is substantially analogous to that of a junction fairing of the prior art. For an inspection or a maintenance operation requiring access to a zone located under the junction fairing 30, it is sufficient to toggle the locking system 60 to the unlocked state and to pivot the cowl 40 about the pivoting axis A42 of the articulation 42. The actuator(s) 68 promotes (promote) the opening of the cowl 40 and the holding thereof in open position. After the intervention, the cowl 40 is pivoted into closed position and the locking system 60 is toggled to the locked state.

According to another embodiment, the cowl 40 could be linked to the fixed frame 32 using a removable link to make it possible to separate it from the fixed frame 32.

Whatever the embodiment, the junction fairing comprises:
  a fixed frame 32, linked to the nacelle 18 and/or to the pylon 22 by a link system 34 configured to absorb any deformations and/or misalignments between the nacelle 18 and the pylon 22 in operation, which has an outer wall 36 comprising an opening 38,
  a cowl 40, that is mobile between a closed position in which it blocks the opening 38 and an open position in which it at least partially frees the opening 38, which has a panel 44,
  the outer wall 36 of the fixed frame and the panel 44 of the cowl 40 having outer surfaces which form the aerodynamic surface of the junction fairing.

Thus, the junction fairing 30 of the invention makes it possible to absorb any deformations and/or misalignments between the nacelle 18 and the pylon 22 in operation, while obtaining easy access to the interior of the nacelle.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A propulsive assembly of an aircraft comprising:
   a nacelle,
   a pylon, and
   a junction fairing having an aerodynamic surface ensuring a continuity between the nacelle and the pylon, wherein the junction fairing comprises:

a fixed frame, linked to at least one of the nacelle or the pylon by a link system configured to absorb deformations or misalignments between the nacelle and the pylon in operation, which has an outer wall comprising an opening, a cowl that is mobile between a closed position in which the cowl blocks the opening and an open position in which the cowl at least partially frees the opening, which has a panel, the outer wall of the fixed frame and the panel of the cowl having outer surfaces which form the aerodynamic surface of the junction fairing, wherein the junction fairing comprises at least one articulation linking the cowl and the fixed frame, wherein the junction fairing comprises a centering system configured to immobilize the cowl according to a direction of flow of an air stream flowing over the aerodynamic surface of the junction fairing in operation, and wherein the centering system comprises at least one centering piece comprising a pin integral to the cowl and a recess integral to the fixed frame, the pin and the recess being configured to occupy an engaged state when the cowl is in the closed position, in which the pin is positioned in the recess, and a disengaged state in which the pin is positioned outside the recess, the pin having a first dimension taken according to the direction of flow that is substantially identical to a second dimension of the recess that is also taken according to the direction of flow.

2. The propulsive assembly according to claim 1, wherein the panel of the cowl has an outline substantially identical to an inner peripheral edge of the outer wall delimiting the opening such that the outer surface of the panel of the cowl is flush with the outer surface of the outer wall of the fixed frame.

3. The propulsive assembly according to claim 1, wherein the articulation is a pivoting link allowing the cowl to pivot about a pivoting axis.

4. The propulsive assembly according to claim 1, wherein the junction fairing comprises a locking system configured to hold the cowl in the closed position.

5. The propulsive assembly according to claim 4,
wherein the articulation is positioned close to a first side of the cowl, and
wherein the locking system is positioned on a second side of the cowl opposite the first side.

6. The propulsive assembly according to claim 1, wherein the junction fairing comprises at least one actuator to at least one of promote an opening movement of the cowl or to hold the cowl in the open position.

7. The propulsive assembly according to claim 1, wherein the link system comprises at least one front link and at least one rear link, each front link being configured to allow a translational movement in a longitudinal direction, each rear link being configured to allow a pivoting movement about an axis of rotation that is horizontal and at right angles to the longitudinal direction.

8. An aircraft comprising at least one propulsive assembly according to claim 1.

* * * * *